US008944469B2

(12) United States Patent
Mulanon

(10) Patent No.: US 8,944,469 B2
(45) Date of Patent: Feb. 3, 2015

(54) TRIPLE—CNG (COMPRESSED NATURAL GAS) CYLINDER MOUNTING DEVICE FOR A VEHICLE

(75) Inventor: Kasap Mulanon, Nakhon Ratchasima (TH)

(73) Assignee: Surayut Posirisuk, Bangkok (TH)

( * ) Notice: Subject to any disclaimer, the term of this patent is extended or adjusted under 35 U.S.C. 154(b) by 165 days.

(21) Appl. No.: 13/392,315

(22) PCT Filed: Aug. 11, 2010

(86) PCT No.: PCT/TH2010/000029

§ 371 (c)(1), (2), (4) Date: Feb. 24, 2012

(87) PCT Pub. No.: WO2011/025465

PCT Pub. Date: Mar. 3, 2011

(65) Prior Publication Data

US 2012/0161430 A1 Jun. 28, 2012

(30) Foreign Application Priority Data

Aug. 25, 2009 (TH) ................................ 0901003820

(51) Int. Cl.
*B60P 3/22* (2006.01)
*F17C 13/08* (2006.01)

(52) U.S. Cl.
CPC ....... *F17C 13/084* (2013.01); *F17C 2205/0107* (2013.01); *F17C 2205/0126* (2013.01); *F17C 2205/013* (2013.01); *F17C 2221/033* (2013.01);
(Continued)

(58) Field of Classification Search
USPC .................................................. 280/830, 834
See application file for complete search history.

(56) References Cited

U.S. PATENT DOCUMENTS

| | | | | |
|---|---|---|---|---|
| 2,557,250 | A * | 6/1951 | Baerwald et al. | 280/830 |
| 5,869,746 | A | 2/1999 | Watanabe | |
| 6,672,620 | B2 * | 1/2004 | Kawazu et al. | 280/834 |

(Continued)

FOREIGN PATENT DOCUMENTS

| | | |
|---|---|---|
| DE | 102009036722 | 3/2010 |
| WO | 2006057765 | 6/2006 |

OTHER PUBLICATIONS

International Search Report and Preliminary Report on Patentability of International Application No. PCT/TH2010/000029, Nov. 29, 2010.

*Primary Examiner* — Kevin Hurley

(74) *Attorney, Agent, or Firm* — Warner Norcross & Judd LLP

(57) ABSTRACT

A triple-CNG (Compressed Natural Gas) cylinder mounting device for a vehicle for mounting a single-gas cylinder placement unit (2) and a dual-gas cylinder placement unit (3) onto the vehicle frame (1) having a right frame member (11) and left frame member (12) partitioned by a front cross-member (13) and a rear cross member (14). The single-gas cylinder placement unit (2) is disposed at the front part of the vehicle frame (1). The single-gas cylinder placement unit (2) is locked by the locking means on the right frame member (11) and/or the left frame member (12) and/or at the front cross-member (13). While, the dual-gas cylinder placement unit (3) is disposed between the middle and rear parts of the vehicle frame (1). The dual-gas cylinder placement unit (3) is locked by the locking means on the frames (11) and/or (12) and optionally on the rear cross-member (14).

2 Claims, 9 Drawing Sheets

(52) U.S. Cl.
CPC ... *F17C 2223/0123* (2013.01); *F17C 2260/053* (2013.01); *F17C 2270/0168* (2013.01)
USPC ........................................................... 280/834

(56) References Cited

U.S. PATENT DOCUMENTS

| | | | | |
|---|---|---|---|---|
| 6,676,163 | B2 * | 1/2004 | Joitescu et al. | 280/834 |
| 7,819,431 | B2 * | 10/2010 | Minami | 280/834 |
| 8,366,152 | B2 * | 2/2013 | Tsubokawa | 280/834 |
| 2006/0061081 | A1 * | 3/2006 | Kresse et al. | 280/834 |
| 2006/0289224 | A1 * | 12/2006 | Ono et al. | 180/311 |
| 2009/0152043 | A1 | 6/2009 | Lee | |
| 2010/0045018 | A1 | 2/2010 | Kondo | |
| 2010/0051625 | A1 | 3/2010 | Dandalides | |
| 2012/0080250 | A1 * | 4/2012 | Ohashi | 180/65.31 |

* cited by examiner

TRIPLE—CNG (COMPRESSED NATURAL GAS) CYLINDER MOUNTING DEVICE FOR A VEHICLE

FIELD OF THE INVENTION

The invention is in the field of Mechanical Engineering relating to a CNG (Compressed Natural Gas) cylinder mounting device for a vehicle.

BACKGROUND OF THE INVENTION

The typical pickup truck with the installation of CNG system has two gas cylinders installed in relation with the amount of CNG that can be contained in the cylinders. Additionally, to install the system, it is required to remove the pickup bed to assemble the gas cylinder mounting device and to drill into the frame of the vehicle for fixing the device to the frame; thus causing difficulties in the parts assembly of the gas cylinder mounting device on the vehicle frame.

DETAILED DESCRIPTION OF THE PREFERRED EMBODIMENTS

Figure 1:
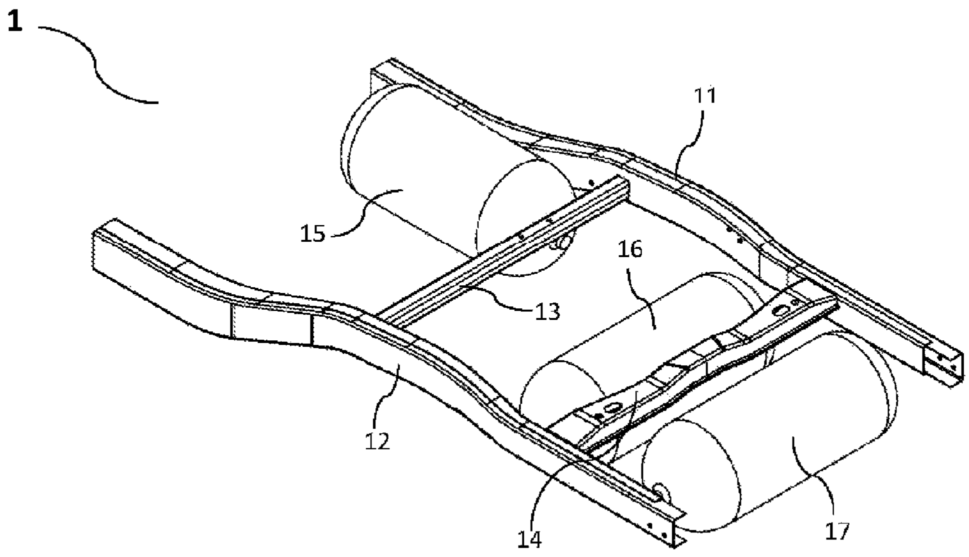
FIG. 1 illustrates the components of the vehicle frame and the placement location of the gas cylinder.
Figure 2:
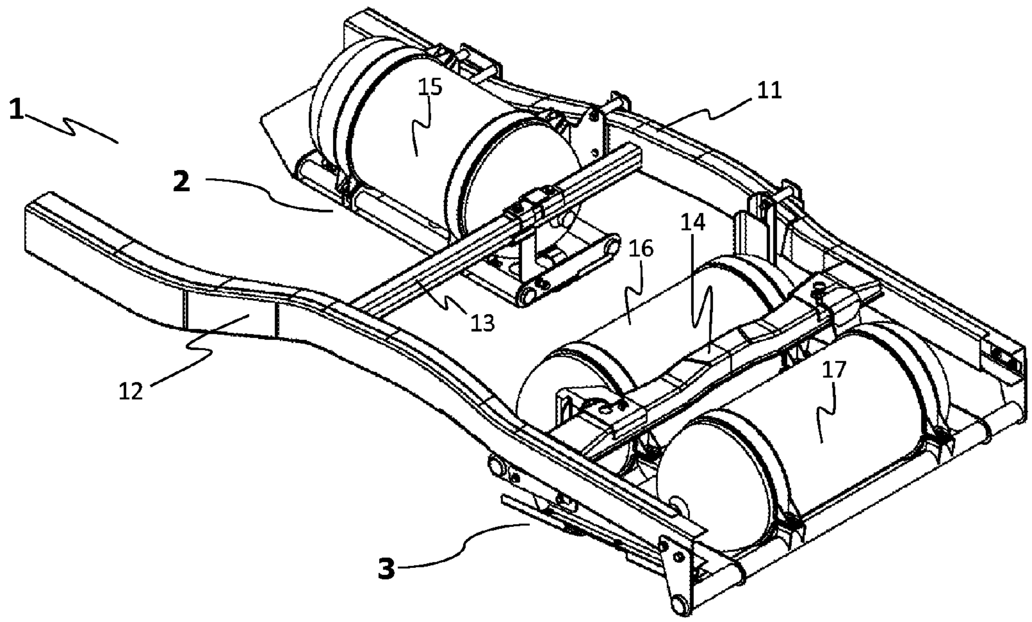
FIG. 2 illustrates a three-gas cylinder mounting device unit.

The invention will now be described by way of example and with reference to the accompanying drawings in which:

The components used in reference to the invention of the three-CNG cylinder mounting device comprises a vehicle frame 1 and three gas cylinders 15, 16 and 17 whereas the vehicle frame is deemed as a starting point when considering the placement of each cylinder and a guideline for the invention of the gas cylinder mounting device. In summary, there are two gas cylinder mounting device units: a single gas cylinder placement unit 2 and a dual cylinder placement unit 3 whereas the single gas cylinder placement unit 2 and the dual cylinder placement unit 3 are assembled separately by each own method. The units have a feature of a cylinder placement frame to be pre-assembled and mount the gas cylinders 15, 16 and 17 before being taken to assemble on the vehicle frame 1. The steps of the invention of the CNG cylinder mounting device are as below:

According to FIGS. 1 and 2, it illustrates the feature of the vehicle frame 1 and the placement location for the gas cylinder 15, 16 and 17 in reference to the following details: The vehicle frame comprises the right frame member 11, the left frame member 12 and the front cross-member 13 whereas each of the first two has a feature of a two-piece plate with holes of different shape and size, folded to form a U shaped cross section joined together by means of fixing to form a steel bar with a square cross section as the right frame member 11, the left frame member 12 extending along the vehicle body (not shown in the figure) and the front cross member 13 has a feature of two-piece plate with holes being through holes for fixing with the spot nuts 18 and is folded into a U shaped cross section. Other connection members may be used, consistent with the spirit of the invention. The two pieces are joined together by means of fixing and placed transversely on the right frame member 11 and the left frame at the front. The joined piece acts as a transverse beam and is fixed to the suspension system of the vehicle (not shown in the figure). The placement of the gas cylinders is divided into two parts: The placement of the single gas cylinder 15 and that of the dual gas cylinder 16 and 17 whereas the single gas cylinder 15 is placed parallel to the right frame member 11 as shown in FIG. 1 and the single gas cylinder placement unit 2 is provided to mount this single gas cylinder onto the vehicle frame; the dual gas cylinder comprising the gas cylinders 16 and 17 is placed parallel to the rear cross member 14 whereas the rear cross member 14 is in between the gas cylinder 16 and 17 and the dual gas cylinder placement unit 3 is provided to mount the gas cylinder 16 and 17 onto the vehicle frame.

Figure 3:
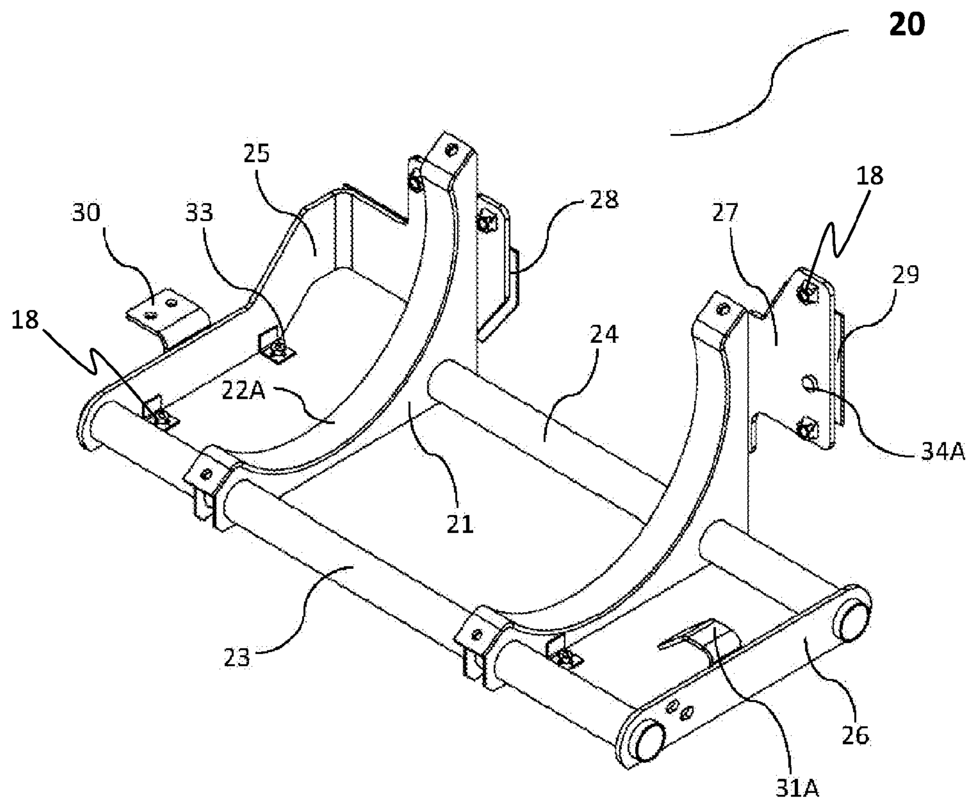
FIG. 3 illustrates a single gas cylinder placement supporting frame.
Figure 4:
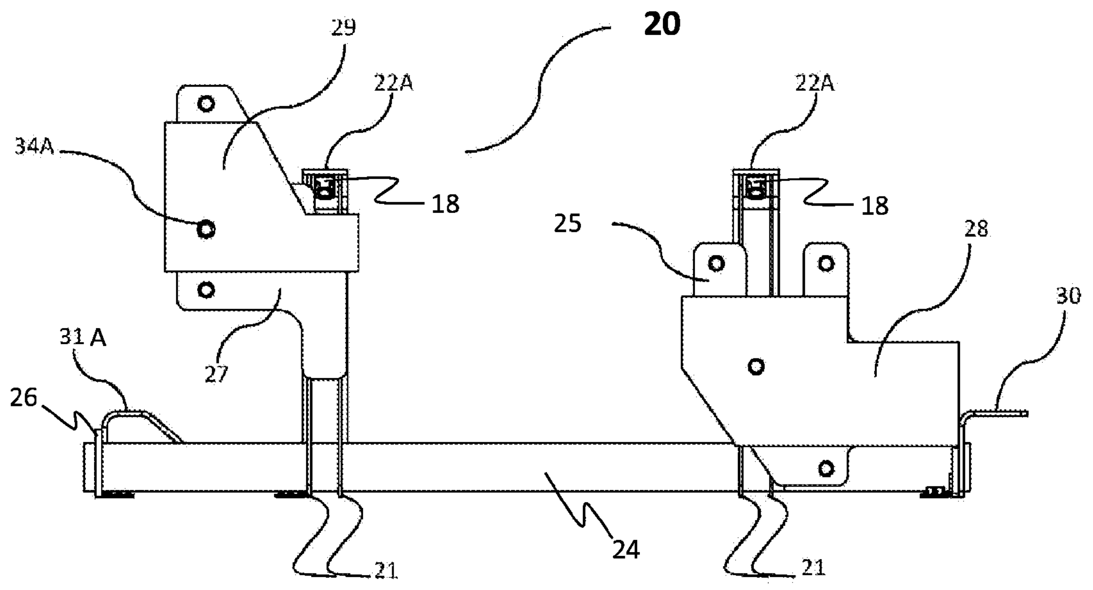
FIG. 4 illustrates the side components of the single gas cylinder placement supporting frame.

The Steps of the Invention of the Single CNG Cylinder Mounting Device with Details as Follows:

According to FIGS. 3 and 4, it illustrates the single-gas cylinder placement supporting frame 20 comprising the cylinder fastening belt supporting sheet 21 with an arch edge in relation to the radius of the gas cylinder 15 and through holes on the bottom thereof for fixing the left front member 23 and right front member 24, in total of two, for supporting the gas cylinder 15, are assembled with the lower cylinder fastening belt 22A by means of fixing whereas the two ends of the lower cylinder fastening belt 22A are perforated and fixed with spot nuts 18 at both ends of the perforated locations under the lower cylinder fastening belt 22A. This single-gas cylinder placement supporting frame 20 is divided to support parts: the front and the back whereas there are provided the left front member 23 and the right front member 24 as a unit connecting between both cylinder placement units. The front part of the single-gas cylinder placement supporting frame 20 comprises the front bracket 25 with a feature of a plate folded into an L shape placed along the front of the single-gas cylinder placement supporting frame 20 whereas the front end is perforated for assembling to the left front member 23 by means of fixing and then orthogonally folded to the side wherein the side end has a feature of a flange fixed to the edge of the cylinder fastening belt supporting sheet 21 by means of fixing. Other locking bracket may be used, consistent with the spirit of the invention. On the flange, there is provided four through holes with spot nuts 18 fixed inside on the four through holes for locking with bolts 19 to fix the single gas cylinder placement supporting frame 20 to the right frame member 11 as in FIG. 4. Other connection members may be used, consistent with the spirit of the invention. The positions of the two fixing holes are on the top of the flange. A bolt 19 is used to fix and lean against the top of the right frame member 11 (not shown) in the middle line of the flange at one hole whereas the bolt 19 is fixed through the right frame member 11 (not shown) and on the bottom of the flange, a bolt 19 is inserted through under the right frame member 11 (not shown) the other hole. The details on the assembly to the vehicle frame 1 will be explained in later steps. On the outside of the front bracket 25, there is provided an inside frame supporting sheet 28 with a contact surface next to the front bracket 25 along the side length and being fixed together by means of fixing. At the front of the front bracket 25, there is provided an counter-slider supporting bracket 30 having a feature of an angle plate with two holes for inserting bolts 19 and two spot nuts 18 next to the bottom of the through holes acting as a stopper holder (not shown) for setting the distance of the single gas cylinder 15. On the back, there are provided two gas cylinder supporting sheets 21 assembled with the lower cylinder fastening belt 22A with two spot nuts 18 fixed there under at the two ends of the lower cylinder fastening belt 22A on both sides by means of fixing. Then the assembled rear cylinder placement unit is assembled with the left front member 23 and the right front member 24 by means of fixing to support the single gas cylinder 15 at the back. Thereafter, the flange is fixed with right frame member 11 comprising inner rear bracket 27 having a feature of two bolt through holes plate 19 with two spot nuts fixed on the through holes whereas the positions of the holes is on the outer edge of the right frame member 11 on both the upper and lower. Other locking bracket may be used, consistent with the spirit of the invention. The middle line of the inner rear bracket 27 is perforated and inserted with the position locking pintle 34A for locating the assembly of the single-gas cylinder placement with the vehicle frame 1. The inner rear bracket 27 and gas cylinder supporting sheet 21 are assembled together by means of fixing. The inner rear frame supporting sheet 29 and the position locking pintle 34 are assembled with the inner rear bracket 27 by means of fixing. Then the rear sheet 26 fixed with the counter slider 31A is assembled with the left front member 23 and the right front member 24 by means of fixing. After that, two of the three cylinder covering brackets 33 are fixed with front bracket 25 and one of that is fixed with the rear bracket 26 by means of fixing.

Figure 5:
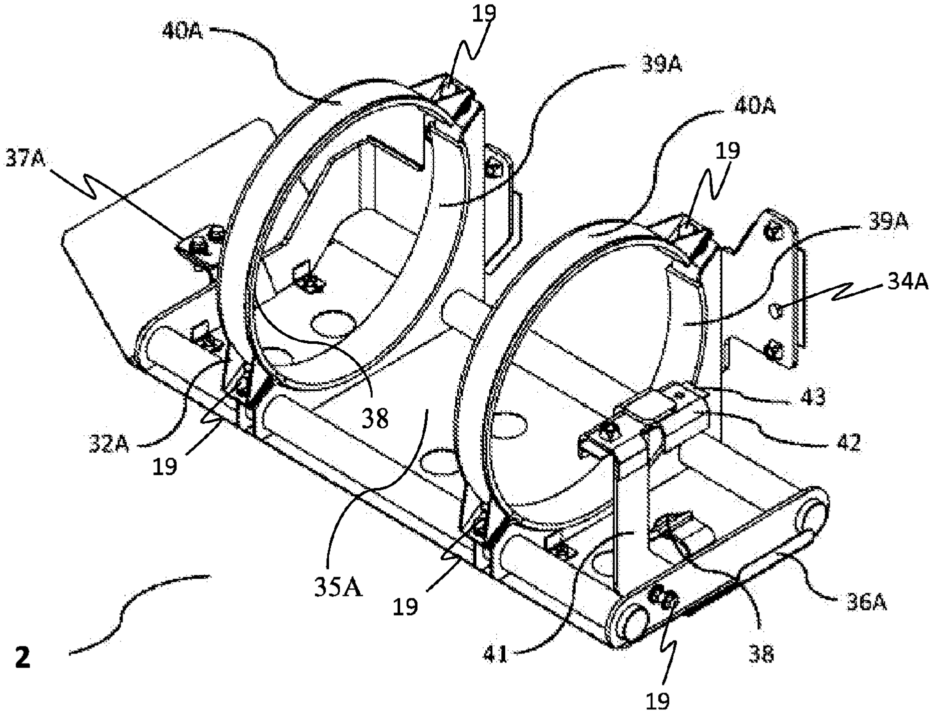
FIG. 5 illustrates the components used for the installation of the gas cylinder on the single-gas cylinder placement unit.
Figure 6:
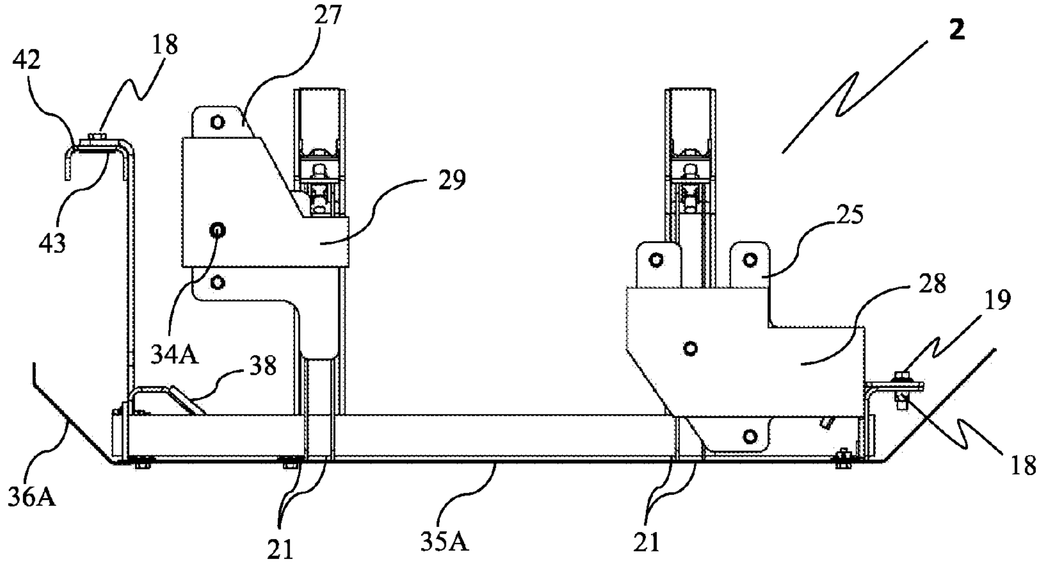
FIG. 6 illustrates the side components used for the installation of the gas cylinder on the single-gas cylinder placement unit.

According to FIGS. 5 and 6, it illustrates the installation of the gas cylinder unit onto the vehicle frame 1. The single-gas cylinder covering sheet 35A and the valve head separator 36A are assembled together by means of fixing to prevent the impact on the gas cylinder 15 (not shown) and cylinder head valve (not shown) whereas the elements are assembled with the single gas cylinder placement supporting frame 20 at the bottom using bolts 19. The counter slider 37A is assembled with the counter slider supporting bracket 30 together with the counter sliding rubber cover 38 as to lock the position of the gas cylinder placement (not shown) and assembled with the counter sliding rubber 38 on the counter slider 31A fixed to the rear sheet 26 for the preparation of the gas cylinder placement 15 (not shown). In the next steps, the upper cross member locking bracket leg 41, the upper cross member locking bracket 42 with a number of spot nuts 18 and the upper cross member supporting sheet 43 are assembled together by means of fixing into the single cross member locking unit and the cylinder fastening belt supporting rubber 39A is assembled with the lower cylinder fastening belt 22A at both the front and the back and the upper cylinder fastening belt 40A at both the front and the back.

The Assembly of the Gas Cylinder Mounting Unit with the Vehicle Frame

The gas cylinder 15 (not shown) is placed between the front and the back of the lower cylinder fastening belt 22A whereas the counter slider supporting bracket 30 is used to determine the rear contacting distance. When the gas cylinder 15 (not shown) is placed, the counter slider 37A is assembled wherein the face of the counter sliding rubber 38 contact against the front of face of the gas cylinder 15 (not shown). Then two bolts 19 are fixed thereto to lock the position of the gas cylinder preventing it from moving. The gas cylinder 15 (not shown) is locked using the upper cylinder fastening belt 40A assembled with the cylinder fastening belt locking bracket 32A at both ends by means of the fixing and put upon the gas cylinder 15 using bolts 19 to tighten it between the upper cylinder fastening belt 40A and the lower cylinder fastening belt 22A at both the front and the back to lock the gas cylinder 15 (not shown) and prevent it from moving. Then the single-gas cylinder placement unit 2 with the installation of the gas cylinder (not shown) by putting it up from below the vehicle without removing the vehicle bed (not shown) is lifted whereas the upper cross member locking bracket 42 is lifted to hook on the front cross member 13. Then the single-gas cylinder placement supporting frame 20 is moved in such a way that the inner rear frame supporting sheet 29 and the inner front frame supporting sheet 28 are contacted with the inside of the right frame member 11 whereas the position locking pintle 34A is inserted into the hole inside the right frame member 11. Subsequently, the single-gas cylinder placement supporting frame 20 is locked with the vehicle frame at each spot.

Figure 7:
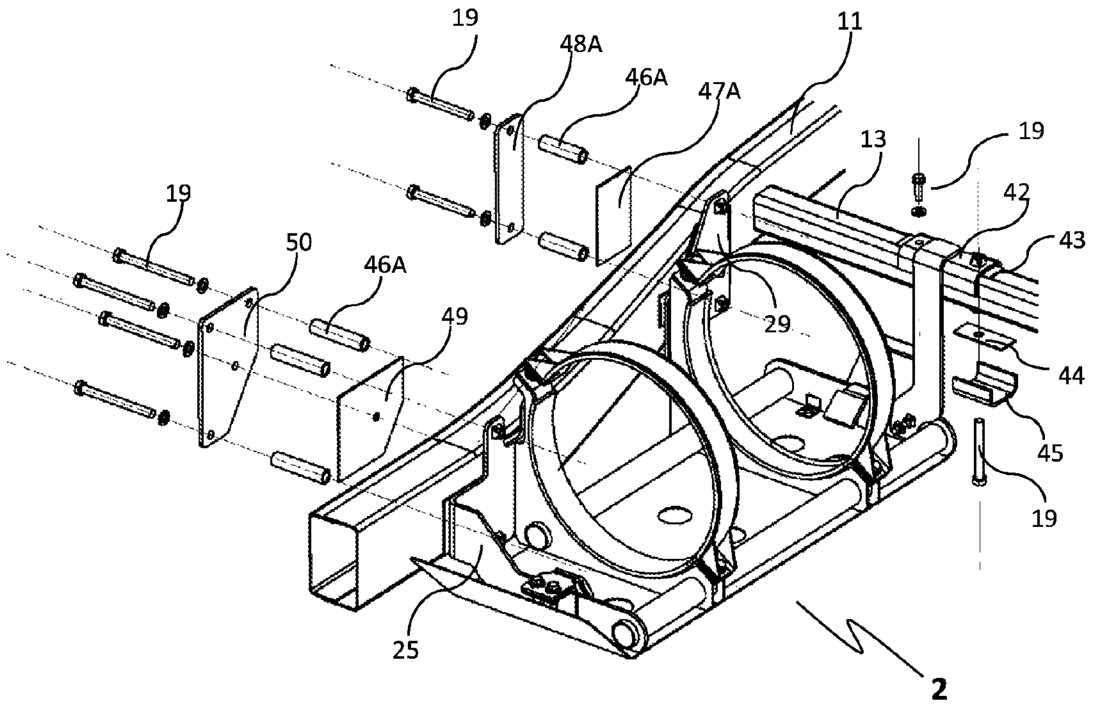
FIG. 7 illustrates the parts assembly of the frame locking bracket unit used to fix the single-gas cylinder placement unit to the vehicle frame.

The Assembly of the Locking Unit for the Single-Gas Cylinder Placement Unit with the Vehicle Frame has Details as Follows:

According to FIGS. 6 and 7, on the inner right front position, there are provided main components: the front bracket 25 having a feature of a plate with edges cut and folded orthogonally in relation to the position of the assembly into an L shape whereas the end of the front is perforated for fitting on the left front member 23. The right side end is a flange with three bolt through holes 19 having spot nuts 18 fixed through all three holes. The inner front frame supporting sheet 28 has a feature of a flat plate with a bolt through holes 19 and a spot nut also fixed through the hole. The outer right front unit comprises the outer front frame supporting sheet 49 with a bolt through hole 19 and the outer front bracket 50 having four screw through holes 19 whereas both sheets are assembled together as such the holes are aligned in the middle line of both sheets and fixed to one another by means of fixing, and is assembled with the outer right front frame member 11. Other free locking bracket may be used, consistent with the spirit of the invention. Later, two of the three frame locking sleeves 46A are inserted between the front bracket 25 and the outer front bracket 50 at the top of the right frame member 11 and the remaining sleeve is at the back as such the holes of all three elements are aligned. Then the bolts 19 are inserted through the holes of the outer front bracket 50, the frame locking sleeves 46A and the front bracket 25 and tightened them with the spot nuts 18 fixed to the front bracket 25. Subsequently, another bolt 19 is inserted through the hole in the middle of the outer front bracket 50, the outer front frame supporting sheet 49, the right frame member 11 and the inner front frame supporting sheet 28 and then is tightened to the spot nut 18 fixed to the inner front frame supporting sheet 28 to end the steps of assembling the right front frame locking unit.

According to FIGS. 6 and 7, it illustrates the inner right rear position of the frame of the main components: the inner rear bracket 27 having a feature of a plate having two bolt through holes 19 together with two spot nuts 18 fixed on the same position as that of the through holes, and another through hole for assembled with the position locking pintle 34A. Later, the inner rear frame supporting sheet 29 with a through hole for assembling with the position locking pintle 34A is assembled with the inner rear bracket 27 whereas the positions of the holes of both position locking pintles 34A are aligned. Subsequently, the position locking pintles 34A are assembled with the holes and fixed them together by means of fixing. When the assembly if finished, the unit is then assembled with the back of the gas cylinder placement sheet 21 whereas the flange of the inner rear frame fixing sheet 27 is joined with the gas cylinder supporting sheet 21 by means of fixing. The outside of the right frame member 11 comprises the outer rear bracket 48A with two bolt through holes 19 fixed on the outer rear supporting sheet 47A by means of fixing. Other free locking bracket may be used, consistent with the spirit of the invention. Then with the outer rear supporting sheet 47A is joined with the right frame member 11 on the outer tab, the back of the outer locking unit and frame sleeve 46A are inserted between the inner rear bracket 27 and the outer rear bracket 48A on both the upper and the lower parts of the right frame member 11 whereas the positions of the holes of the three components are aligned. Later, two bolts 19 are inserted through the holes of the outer rear bracket 48A, the frame locking sleeve 46A and the inner rear bracket 27 and then tightened with the two spot nuts 18 to end the steps of the assembly of the right rear frame locking unit.

The Position of the Cross Member Locking Unit has the Details and the Steps of the Assembly as Follows:

The front cross member 13 has a feature of the plates folded into a U shape, assembled and fixed together by means of fixing and provided with a rectangular cross section with two through holes on the upper and one through hole of the lower parts wherein the spot nut 18 is fixed inside (not shown). The upper cross member locking bracket 42 has a feature of a plate folded into a U shape, having two bolt through holes 19 and one spot nut 18 fixed on the outside while the inside is assembled with the upper cross member supporting sheet 43 and the front cross member 13 whereas the position of the through holes of both components are aligned to allow the bolts 19 to go through. Then the first bolt 19 is fixed by inserting through the holes of the upper cross member locking bracket 42, the upper cross member supporting sheet 43 and the front cross member 13 and tightened with spot nuts 18 (not shown) fixed inside the front cross member 13. Later, the lower cross member locking bracket 45 having a feature of a plate folded into a U shape with a bolt through holes 19 is fixed with the lower locking bracket supporting sheet 44 also having the through hole by means of fixing and then covers the bottom of the front cross member 13 whereas the positions of the through holes of both components are aligned. Other free locking bracket may be used, consistent with the spirit of the invention. Subsequently the bolts 19 are inserted from the bottom to the top through the holes of the lower cross member locking bracket 45, the lower locking bracket supporting sheet 44, the front cross member 13, the upper cross member supporting sheet 43 and the upper cross member locking bracket 42 and tightened with spot nuts 18 fixed on the upper cross member locking bracket 42 to end the method of the invention of the single-gas cylinder placement unit mounting device on the vehicle frame.

Figure 8:
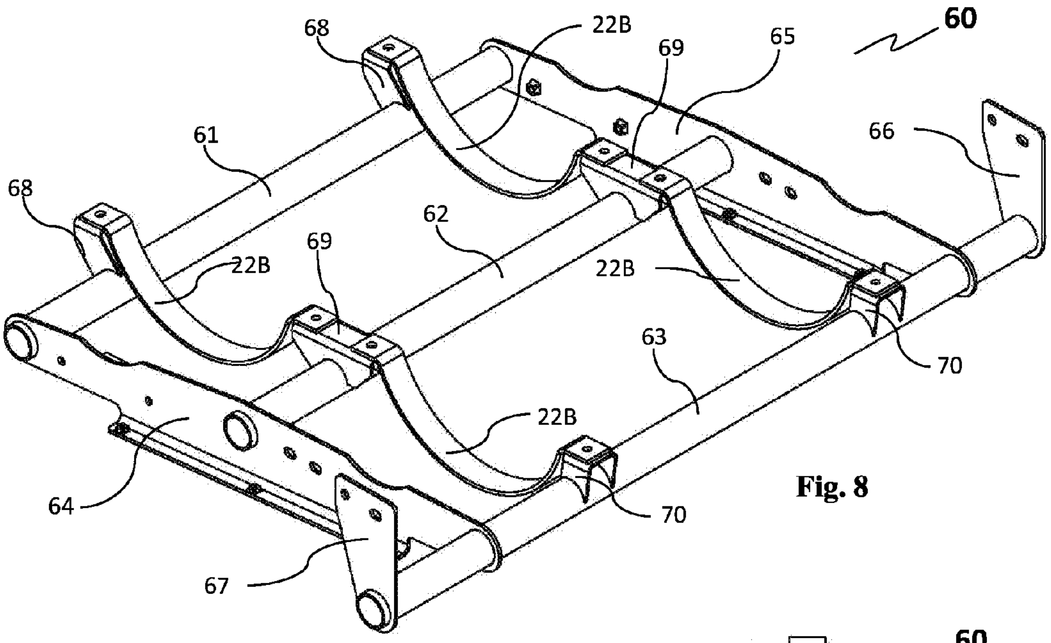
FIG. 8 illustrates a dual gas cylinder placement supporting frame.
Figure 9:
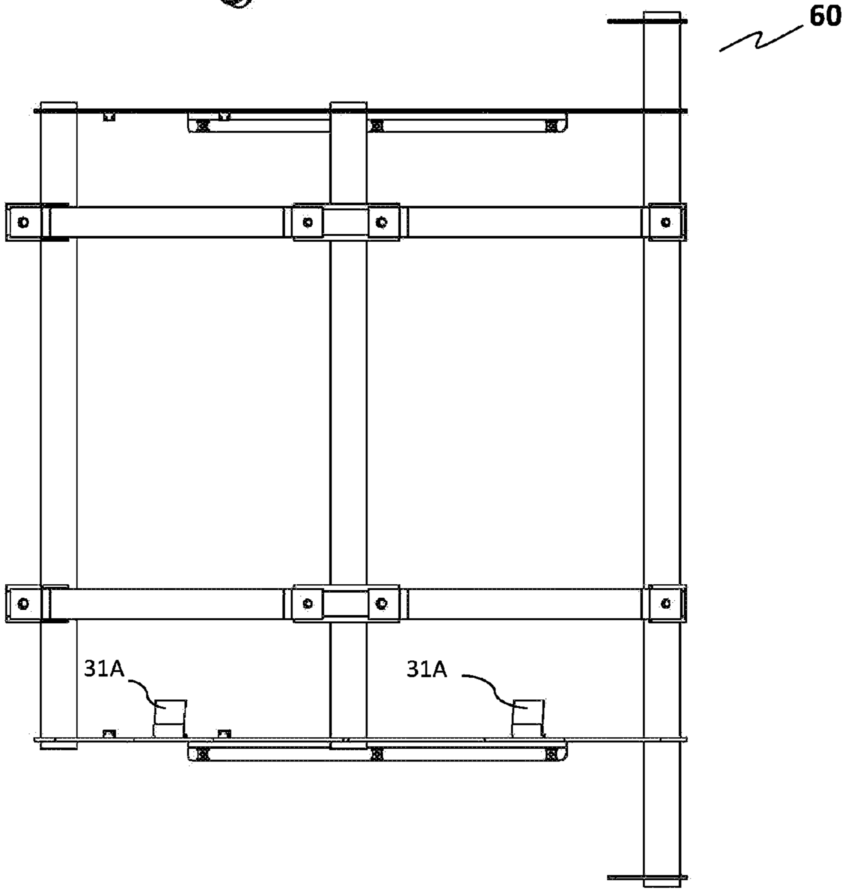
FIG. 9 illustrates the top view of the dual gas cylinder placement supporting frame.

The Steps of the Invention of the Dual CNG Cylinder Mounting Device are Detailed as Follows:

According to FIGS. 8 and 9, it illustrates the dual gas cylinder placement supporting frame 60 comprising the front member 61, the middle member 62 and the rear member 63 whereas the length of the front member 61 and the middle member 62 are the same but shorter than the rear member. All members are arranged parallel to one another as in FIG. 8 whereas the left bracket 64 is assembled with the end of the front member 61 and the middle member 62 on the left and the right member 65 is assembled with the end of the front member 61 and the middle member 62 on the right. The rear member 63 having the length longer than the length of the end will eventually have the average length as same when assembled with the left bracket 64 and the right bracket 65 whereas all the mentioned components namely the front member 61, the middle member 62, the rear member 63, the left bracket 64 and the right bracket 65 will assembled altogether as the gas cylinder placement frame 15, 17 by means of fixing. Upon the completion of the gas cylinder placement frame, the sub-brackets are assembled as follows: the front sub-bracket 61 having a feature of a plate is perforated as a screw through hole 19 on the middle line and on the end with an edge cut in relation to the curve of the radius of the front member 61, folded into a U shape and then fixed with spot nut 18 inside on the through hole where two front sub-brackets 68 are joined to the front bracket 61 by means of fixing as to support the lower cylinder fastening belt 22B (not shown) and to tighten the gas cylinder 16 with the upper cylinder fastening belt 40B (not shown). The middle bracket having a feature of a plate, with two bolt through holes 19 and the side edge cut into a curve in relation with the radius of the middle member 62, folded into a U shaped wing and then fixed with two spot nuts 18 on the inside of the two through holes is made into two sub-brackets assembled with the middle member 62 by means of fixing as to support the lower cylinder fastening belt 22B and to fix the gas cylinder 16 and 17 to the upper cylinder fastening belt 40B. The rear sub-bracket 70 having a feature of a plate with a bolt through hole 19 on the middle line and on the end cut into an edge with a curve in relation to the radius of the rear member 63 and folded into a U shape and fixed with spot nut 18 on the inside of the through hole. The two rear sub-bracket 70 are assembled with the rear member 63 by means of fixing as to support the lower cylinder fastening belt 22B and to fix the gas cylinder 17 to the upper cylinder fastening belt 40B. On the left, the end of the rear member 63 is assembled with the outer left frame locking sheet 67 and on the right, it is assembled with the outer right frame locking sheet 66 by means of fixing as to fix the dual gas cylinder placement supporting frame 60 to the left frame member 12 and the right frame member 11. Other locking bracket may be used, consistent with the spirit of the invention. The left bracket 64 and the right bracket 65 has a feature of a plate with a lower edge folded orthogonally into a wing being a flange for assembling the dual cylinder covering sheet 35B onto the bottom and the perforation on the flange is made into three through holes for the bolts 19. The spot nuts are fixed on the top of the three through holes as to fix the bolts 19 for locking the dual cylinder covering sheet 35B, the valve head separator 36B and 36C. On the front of the left bracket 64 and the right bracket 65, there are provided through holes for fixing to the front member 61 at the front position the middle 62, the middle position of the rear member 63, the rear position between the fixing points of the front member 61 and the middle member 62 is perforated into two bolt through holes and in between the fixing points of the middle member 62 and the rear member 63, there are provided two slots whereas the left bracket 64 and the right bracket 65 have the same feature. However when they are assembled into a dual gas cylinder placement supporting frame 60, the inside of the left bracket 64 is fixed with the spot nuts at the two bolt through holes 19 as to fix the left sub-cross member bracket 71 (not shown) and in between the inside of the front member 61 and the middle member 62 and the rear member 63 is fixed with a counter slider 31A each for set the placement position of the gas cylinder 16 and 17 (not shown). Both the spot nut 18 and the counter slider 31A are assembled with the left bracket 64 by means of fixing. The right bracket 65 at the bolt through holes 19 between the fixing points of the inside of the front member 61 and the middle member 62 are fixed with two spot nuts 18 by means of fixing as to fix the inner frame supporting bracket leg 84 (not shown).

Figure 10:
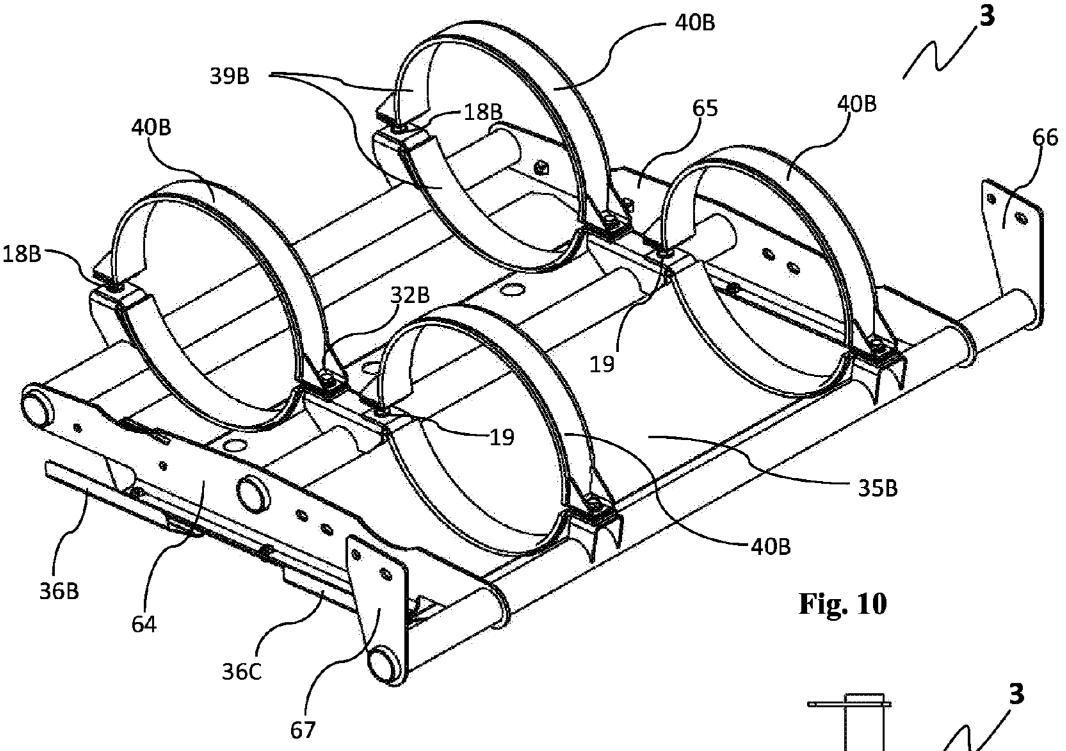
FIG. 10 illustrates the components used for the installation of the gas cylinder on the dual gas cylinder placement unit.
Figure 11:
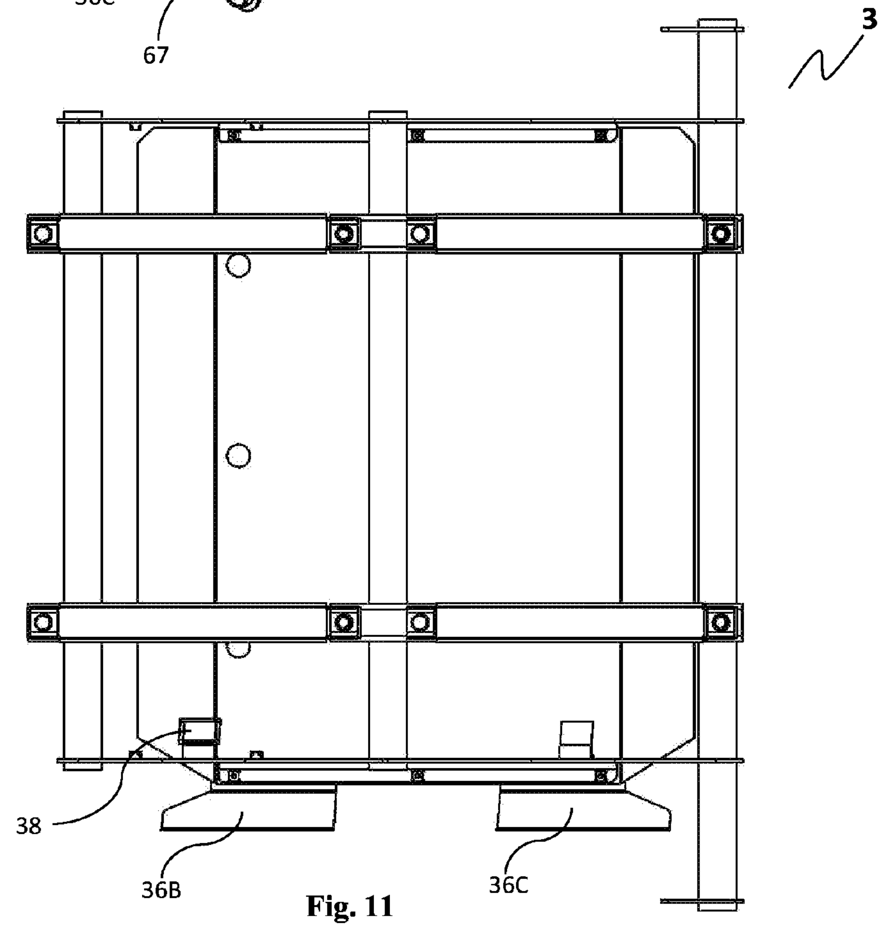
FIG. 11 illustrates the top view of the components used for the installation of the gas cylinder on the dual gas cylinder placement unit.

The Assembly of the Gas Cylinder 16 and 17 with the Dual Gas Cylinder Placement Unit According to FIGS. 9, 10 and 11, upon the assembly of the dual gas cylinder placement supporting frame 60, the following steps are the assembly of the gas cylinder mounting device 16 and 17: the dual cylinder covering sheet 35B is assembled with the dual gas cylinder placement supporting frame 60 at the bottom by fixing bolts 19 at the front, the middle and the back to three spot nuts 18 on the flange of the right bracket 65 before locking the flange of the left bracket 64 only at the middle position with the spot nuts 18 on the flange of the left bracket 64. Subsequently, the valve head separators 36B and 36C are assembled with the dual cylinder covering sheet 35B whereas the valve head separator 36B having a feature of a plate folded to an angle on the bottom is folded into a flange for assembled with the dual cylinder covering sheet 35B and perforated for a bolt through hole 19 at the front position of the left bracket and then bolts 19 is inserted through the top to fix with the spot nut 18 at the front of the left bracket flange 64 and tightened. The valve separator 36C having a plate folded to an angle and perforated for a bolt through hole 19 on the flange assembled with the dual cylinder covering sheet 35B is assembled with the dual cylinder covering sheet 35B at the bottom position of the rear left bracket 64 and the bolt 19 is used to tightened as in the case of the valve head separator 36B. Subsequently, the counter slider rubber 38 is assembled with the two counter sliders 31A and the gas cylinder fastening belt supporting rubber 39B is assembled with all four lower cylinder fastening belts 22B. Upon the assembly of the supporting rubber at all six spots, both gas cylinder 16 and 17 (not shown) are placed between the lower cylinder fastening belts 22B of each part. Upon the placement of the gas cylinder 16 and 17 (not shown), both cylinders are moved to the left bracket 64 as to allow the gas cylinder 16 and 17 (not shown) contact with the two counter sliding rubber face 38 covering the counter slider 31A to complete the steps for locating the placement position of the gas cylinders 16 and 17. The four upper cylinder fastening belts 40B are assembled with the four gas cylinder fastening belt supporting rubbers 39B and cover them onto the gas cylinders 16 and 17 (not shown) whereas the positions of the bolt through holes 19 of the upper cylinder fastening belt 40B and the lower cylinder fastening belt 22B are aligned. Then the bolts 19 are assembled on the cylinder fastening belt bracket 32B and locked with the two spot nuts 18 at the bottom of the lower flange of the middle sub-bracket 69 at the front on both left and right whereas the flange of the lower cylinder fastening 22B and the flange of the cylinder fastening belt locking bracket 32B are completely attached. Upon locking, bolts 19 are used for fixing the cylinder fastening belt locking bracket 32B to the lower cylinder fastening belt 22B at the position of the lower member 63 at two spots whereas the locking fashion is the same as that of the position of the middle sub-bracket 69 at the front. The locking fashion of the cylinder fastening belt locking bracket 32B to the flange of the lower cylinder fastening belt 22B at all four spots is the locking of the upper cylinder fastening belt 40B to the dual gas cylinder placement supporting frame 60 before locking the upper cylinder fastening belt 40B as to lock the gas cylinders 16 and 17 to the dual gas cylinder placement supporting frame 60 at another 4 spots whereas it relates the mounting procedure wherein the steps of fixing the upper cylinder fastening belt 40B at the left and right positions of the front member 61 and at the positions of the middle member 62 at the back on both left and right for all four spots are as follows: the bolt 19 are inserted through the holes of the cylinder fastening locking bracket 32B and the upper cylinder fastening belt 40B and then the locking nut 18B is assembled with the bolt 19 whereas the locking nut 18B acts as the counter loosen unit of the bolt 19 when subject to the vibration. Subsequently the bolt 19 is pushed into the holes of the front bracket 68 and the middle bracket 69 at the back to tighten and fix it onto the spot nut 18 fixed on the bottom of the through holes of the front sub-bracket 68 and the middle sub-bracket 69 and then the locking nut 18B is tightened with the front sub-bracket 68 and the middle sub-bracket 69 at all four spots on the top to prevent the bolts 19 from being loosened.

Figure 12:
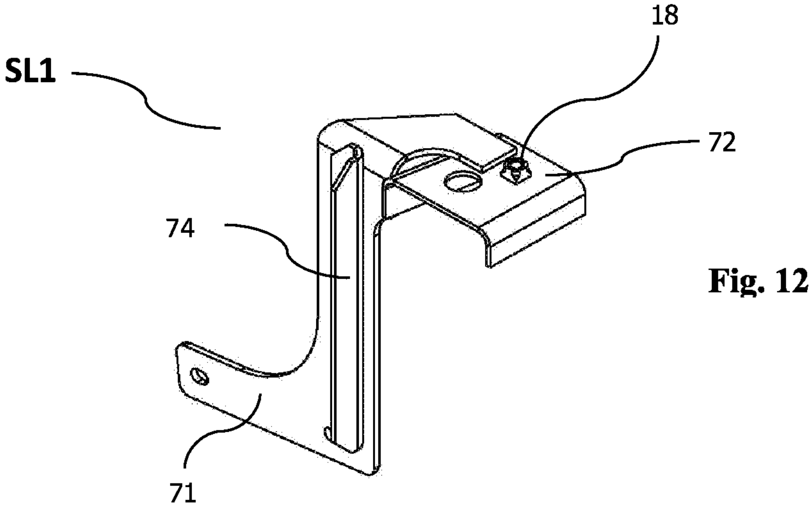
FIG. 12 illustrates the left rear cross-member locking unit.
Figure 13:
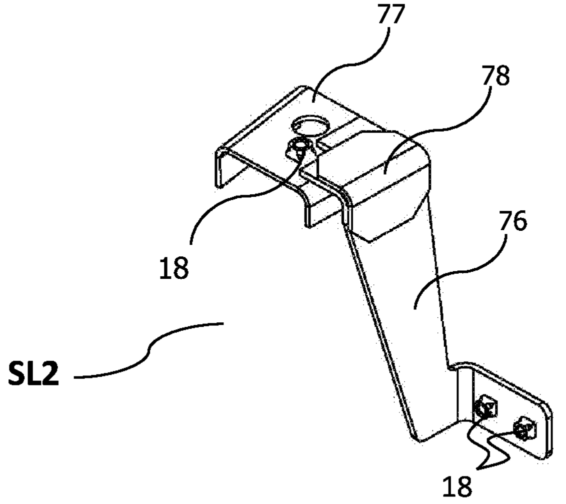
FIG. 13 illustrates the right rear cross-member locking unit.
Figure 14:
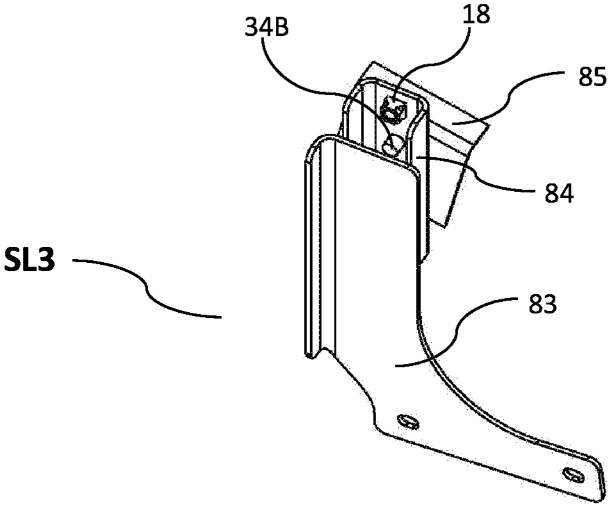
FIG. 14 illustrates the right frame locking unit.

The Assembly of the Dual Cylinder Placement Unit Mounting Device Unit with the Vehicle Frame According to FIGS. 12, 13 and 14, upon the assembly of the gas cylinder 16, 17 onto the dual gas cylinder placement supporting frame 60, the installation device used to fix on three main spots between the dual gas cylinder placement supporting frame 60 and the vehicle frame 1 is assembled as follows: at the first spot, on the position on the left of the dual gas cylinder placement supporting frame 60, there is provided a dual cylinder placement locking unit 60 fixed to the vehicle frame 1 called the left rear cross member locking unit SL1 whereas this device unit is fixed with the rear cross member 14 on the left comprising different parts and the assembling steps are as follows: the left cross member bracket 71 having a feature of a plate of which the lower part is a flange with two through holes for the bolts 19 to go through whereas this flange is used to fix with the left bracket 64 (not shown). Other locking bracket may be used, consistent with the spirit of the invention. The middle line of the left sub-cross bracket 71 is provided with the left reinforcing bracket 74 with a feature of a plate folded orthogonally, fixed with the body of the left sub-cross bracket 71 by means of fixing. The upper end of the left sub-cross bracket 71 is fixed with the left cross member locking bracket 72 by means of fixing whereas the left cross member locking bracket 72 has a feature of a plate folded into a U shape whereas the wing of the U shape is tilted in relation to the position of the position of the assembly of the rear cross member 14 and the left rear cross member locking bracket 72 is provided with two through holes whereas one hole acts as a bolt through hole 19 with a spot nut 18 fixed on the top while another hole is for hiding the electric wire unit (not shown) as to complete the preparation of the left rear cross member locking unit SL1; at the second spot, the right position of the dual cylinder placement supporting frame 60, there is provided the device unit fixed with the rear cross member 14 on the right called the right cross member locking unit SL2 comprising different parts and the assembling steps are as follows: the right sub-cross bracket 76 having a feature of a plate folded into a shape whereas the lower end is a flange with two through holes and two spot nuts 18 fixed thereon. Other locking bracket may be used, consistent with the spirit of the invention. At the position of the through holes, this flange is assembled with the right bracket 65 (not shown). The middle line of the right sub-cross bracket 76 is projecting upward and the upper end is folded orthogonally whereas the end of the flange is fixed to the right cross member locking bracket 77 by means of fixing wherein the right rear cross member locking bracket 77 has features and sub-component parts as same as those of the left side with a difference in the directions that are opposite to one another. On the upper part of the right sub-cross bracket 76, there is provided the right reinforcing bracket 78 being a assembled plate folded orthogonally that is fixed by means of fixing to complete the preparation of the right rear cross member locking unit SL2; and at the third spot, the right position of the dual gas cylinder placement supporting frame 60, there is provided the right side frame locking unit SL3 as a mounting device used to fix the dual gas cylinder supporting frame 60 to the vehicle frame 1 at the right frame member 11 whereas this device unit is called the right side frame locking unit SL3 having the assembling steps and component parts as follows: the inner frame supporting bracket 83 has a feature of the plate having the laying line next to the right bracket 65 whereas the lower end has a feature of a flange with two bolt through holes 19 while on another end, the plate is laid upward to the top vertically and folded orthogonally on its sides along the vertical line to reinforce the bracket and the upper end is assembled with the inner frame locking bracket 84 having a feature of a plate folded into a shape of a U shaped cross section with three through holes whereas the upper holes and the lower holes have two spot nuts 18 assembled inside of the bracket. At the middle hole, the locking nut 34B is fixed as in the same fashion by means of fixing as to set the placement position of the dual gas cylinder placement supporting frame 60 for the installation onto the vehicle frame. Other locking bracket may be used, consistent with the spirit of the invention. Subsequently, the inner frame locking bracket 84 previously assembled with the spot nut 18 and the position locking pintle 34B is assembled with the inner frame supporting bracket leg 83 by means of fixing. Then the inner frame supporting bracket 85 featuring a plate folded orthogonally into a L shape with a locking pintle through hole 34B is assembled with the inner frame locking bracket 84 whereas the through hole of the inner frame supporting bracket 85 is inserted into the locking pintle 34B and then fixed to one another by means of fixing to complete the preparation of the mounting device at the third position.

Figure 15:
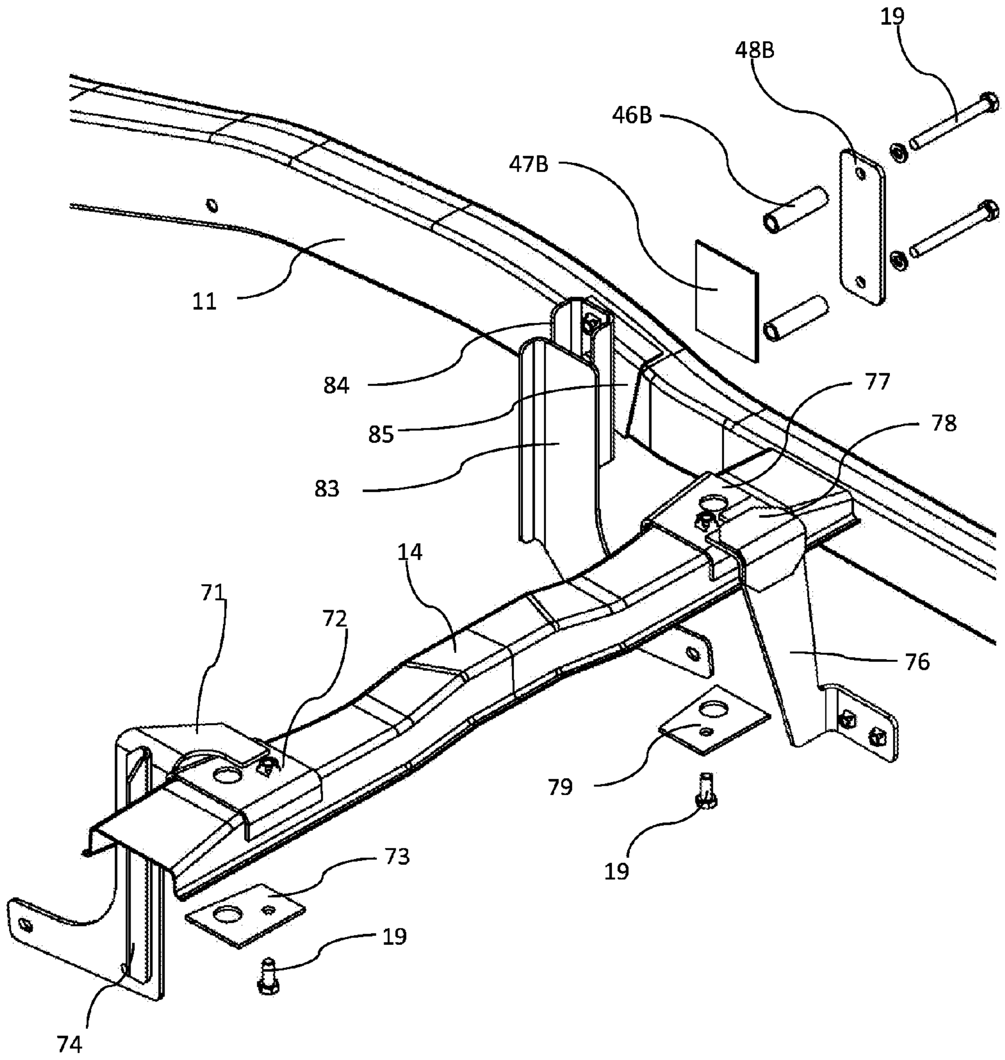
FIG. 15 illustrates the assembly of the dual gas cylinder placement unit locking unit onto the vehicle frame.

According to FIG. 15, upon the preparation of the holding unit between the dual cylinder placement supporting frame 60 and the vehicle frame 1 comprising the left rear cross member locking unit SL1, the right cross member locking unit SL2 and the right side frame locking unit SL3 whereas both of the left rear cross member locking unit SL1, the right rear cross member locking unit SL2 is installed in the middle line of the dual cylinder placement supporting frame 60 and the right side frame locking unit SL3 is installed at the right front of the dual cylinder placement supporting frame 60, the next step is the installation of the dual cylinder placement supporting frame onto the vehicle frame 1 with details as follows: the dual gas cylinder placement supporting frame 60 mounting the gas cylinders 16 and 17 is inserted into the vehicle frame 1 and lifted it up as such there is enough room to enable the assembling of the left rear cross member locking unit SL1 and right rear cross member locking unit SL2 together. Subsequently, the left rear cross member locking unit SL1 is assembled by hooking the left cross member locking bracket 72 with the rear cross member 14 on the left whereas the position of the through hole of the left rear cross member locking bracket 72 is aligned with that of the rear cross member 14 on the left. Then the left rear cross member locking sheet 73 is assembled inside the bottom of the rear member 14 on the left whereas the left rear cross member locking sheet 73 has a bolt through hole 19 which a bolt 19 is inserted through the left rear cross member locking sheet 73, the rear cross member 14 and the left rear cross member locking bracket 72, and fixed it, but loosely, with bolt 19 to the spot nut 18 fixed on the top of the left rear cross member locking bracket 72. Other free locking bracket may be used, consistent with the spirit of the invention. Then the lower flange of the left sub-cross bracket 71 is assembled with the left bracket 64 (not shown) whereas the positions of the bolt through holes 19 of both parts are aligned. Subsequently, two bolts 19 are inserted through the holes of the left sub-cross bracket 71 and the left bracket 64, then tightened it with spot nut 18 fixed on the inside of the left bracket 64 using a moderate tightening force. Next, it is the assembly of the right rear member locking unit SL2 with the vehicle frame 1 and the dual gas cylinder placement supporting frame 60: The cross member locking unit SL2 on the right rear cross member locking bracket 77 is hooked with the rear cross member 14 on the right first, then the right rear cross member locking sheet 79 is assembled with the inside of the bottom of the rear cross member 14 on the right whereas the right rear cross member locking sheet 79 has a bolt through hole 19. Subsequently, the bolt 19 is inserted through the right rear cross member locking sheet 79, the rear cross member 14 and the right rear cross member locking bracket 77, then tightened as in the same fashion as in the case of the left side, with the spot nut 18 fixed on the top of the right rear cross member locking bracket 77. Other free locking bracket may be used, consistent with the spirit of the invention. Subsequently, the lower flange of the right sub cross bracket 76 is assembled with the right bracket 65 (not shown) as such the position of the bolt through hole 19 of both parts are aligned. Then, two bolts 19 are inserted through the holes of the right bracket 65 and the right sub-cross bracket 76 and tightened with the spot nuts 18 fixed on both right sub-cross brackets 76 with a moderate tightening force to complete the assembly of the dual gas cylinder placement supporting frame 60 in the middle line. Next, it is the assembly of the right side frame locking unit SL3 with the dual gas cylinder placement supporting frame 60 and the vehicle frame 1: the inner frame supporting bracket 85 of the right side frame locking unit SL3 is assembled with the right frame member 11 whereas the position locking pintle 34B is put into the side through hole of the right frame member 11 as to lock the position of the right side frame locking unit SL3, then the inner frame supporting bracket 85 is pushed to contact closely with the side of the right frame member 11. Subsequently, the frame locking sleeve 46B is assembled with concentrically with the through hole of the inner frame locking bracket 84 whereas this sleeve is blended over the top of the right frame member 11 and the rear bracket 48B is assembled further whereas the sheet has a feature of a plate with two bolt through holes 19 and the outer rear supporting sheet 47B featuring a assembled plate be means of fixing. Other free locking bracket may be used, consistent with the spirit of the invention. Then the bolt 19 is inserted through the hole of the rear bracket 48B, the frame locking sleeve 46B and the inner frame locking bracket 84, and tightened with the spot nut 18 fixed inside the inner frame locking bracket 84. Subsequently, the frame locking sleeve 46B is assembled at the bottom of the right frame member 11 and fixed in the same fashion as with the other upper position.

Then the lower flange of the inner frame supporting bracket leg 83 is assembled with the right bracket 65 whereas the positions of the through holes of both parts are aligned. Later, the bolts 19 are inserted through the holes of the inner frame supporting bracket leg 83 and the right bracket 65 and tightened with the spot nut s18 fixed inside the right bracket 65.

Figure 16:
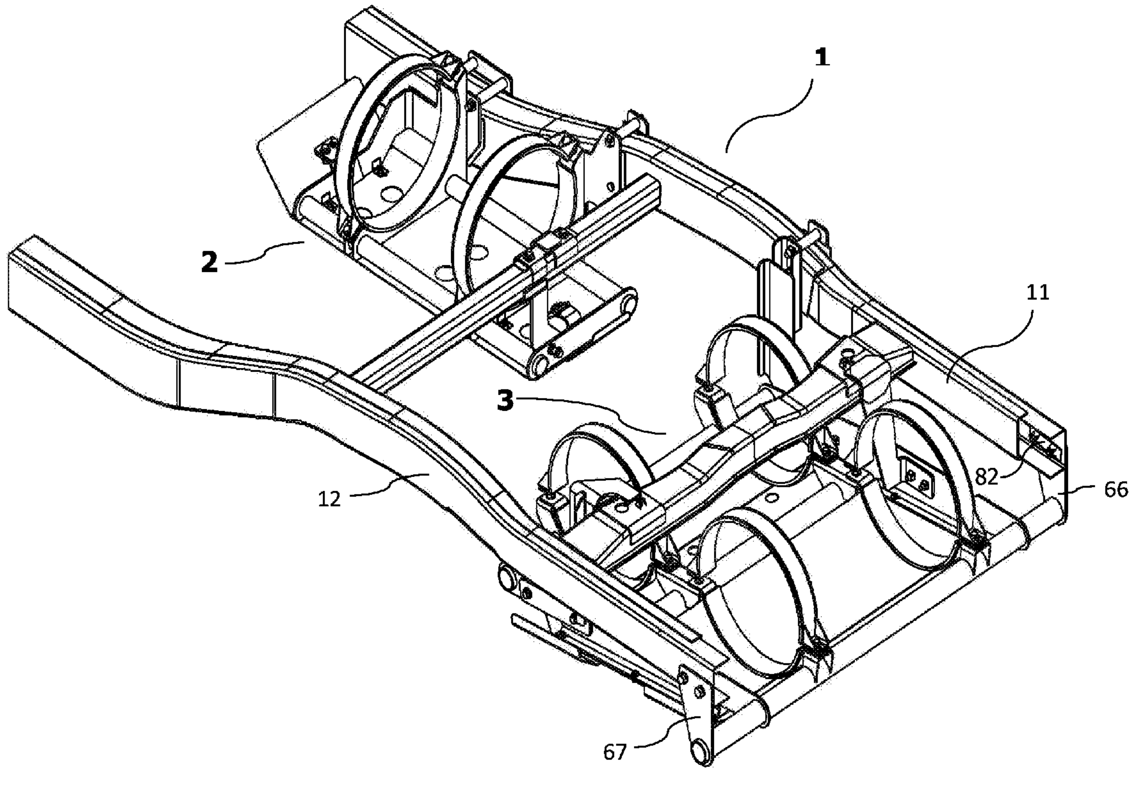
FIG. 16 illustrates the device unit for the installation of both gas cylinder units onto the vehicle frame.

According to FIG. 16, the frame locking sheet on the rear line of the dual gas cylinder placement supporting frame 60 is fixed onto the vehicle frame 1. Upon the complete installation of the left rear cross member locking unit SL1, the right rear cross member locking unit SL2 and the right side frame locking unit SL3, the position of the through holes of the outer left frame locking sheet 67 and the outer right frame locking sheet 66 are well-aligned with the through holes on the left frame member 12 and the right frame member 11 enabling the parts to be assembled to one another whereas the inner left frame locking sheet 81 and the inner right frame locking sheet 82 each of which has a feature of a plate with two bolt through holes 19 and two spot nuts 18 fixed inside the left frame member 12 and the right frame member 11. Subsequently, the bolts 19 are assembled by which the bolts are inserted through the outer left frame locking sheet 67, the left frame member 12 and the inner left frame locking sheet 8, then tightened with two spot nuts 18 fixed to the inner left frame 81 for locking the parts. Subsequently, the right frame is locking by which both of the inner right frame locking sheet 82 are assembled with the right frame member 11 inside and then two bolts 19 are assembled by inserting them through the outer right frame locking sheet 66, the right frame member 11 and the inner right frame locking sheet 82 and tightened with two spot nuts 18 fixed inside the right frame locking sheet 82 for the assembly of the whole mounting device. At the end, the bolts 19 are tightened with the spot nuts 18 at all positions of the bolts with a locking unit that can measure the amount of the force.

The invention claimed is:

1. A triple-gas cylinder mounting device for a pickup truck comprising:

a single-gas cylinder mounting device for mounting onto a vehicle frame having a right frame member and left frame member partitioned into front, middle, and rear parts by a front cross-member and a rear cross-member, a single-gas cylinder placement unit having a single-gas cylinder placement supporting frame, and a plurality of cylinder fastening belts composed of a lower cylinder fastening belt and an upper cylinder fastening belt thereon for supporting a single-gas cylinder, the mounting device comprising:

a first locking means for locking the single-gas cylinder placement unit onto the right frame member and/or the left frame member in the front part of the vehicle frame and optionally the single-gas cylinder placement unit is further locked onto the front cross-member, said first locking means including one or more locking brackets;

wherein at least one of the locking brackets of the first locking means is attached to the single-gas cylinder placement unit and another locking bracket is free, assembling them together between the frame member and/or the front cross-member with a connection member to lock the unit with the vehicle frame and optionally with the front cross-member; and wherein said connection member includes a nut and a bolt, and wherein said bolt is inserted into the free locking bracket from the outside of the vehicle frame in penetration therethrough, and a dual-gas cylinder mounting device for mounting onto a vehicle frame a dual-gas cylinder placement unit having a dual-gas cylinder placement supporting frame and at least two cylinder fastening belts composed of a lower cylinder fastening belt and an upper cylinder fastening belt thereon for supporting a dual-gas cylinder, the mounting device comprising;

a second locking means for locking the dual-gas cylinder placement unit onto the right frame member and/or the left frame member between the middle and rear of the vehicle frame, and optionally for further locking the dual-gas cylinder placement unit onto the rear cross-member and optionally for further locking the unit at the rear end of the frame members, said second locking means including one or more locking brackets;

wherein at least one of the locking brackets of the second locking means is attached to the dual-gas cylinder placement unit and another locking bracket is free, assembling them together between the frame member and/or the rear cross-member with a connection member to lock the dual-gas cylinder placement unit with the vehicle frame and optionally with the rear cross-member;

wherein said connection member includes a nut and a bolt, and wherein said bolt is inserted into the free locking bracket from the outside of the vehicle frame in penetration therethrough.

2. Jigs and fixtures for a triple-gas cylinder for a pickup truck including the jigs and fixtures for a single-gas cylinder placement unit having a single-gas cylinder placement supporting frame and at least one cylinder fastening belt thereon for supporting the single-gas cylinder; wherein the single-gas cylinder unit is locked by a first locking means including one or more locking brackets;

wherein at least one of the two or more locking brackets of the first locking means is attached to the unit and another locking bracket is free, assembling them together between the frame member and/or the front cross-member with connection member to lock the unit with the vehicle frame and optionally with the front cross-member; and wherein said connection member including a nut and a bolt, and wherein said bolt is inserted into the free locking bracket from the outside of the vehicle frame in penetration therethrough on the front part of the vehicle frame on the right and/or the left of the frame and/or on the front cross-member, and the jigs and fixtures for a dual-gas cylinder for a pickup truck including a dual-gas cylinder placement unit having a dual-gas cylinder placement supporting frame and at least two cylinder fastening belt thereon for supporting a dual-gas cylinder; wherein the dual-gas cylinder placement frame is placed between the middle and rear parts of the vehicle frame partitioned by the rear cross-member and is locked by a second locking means including one or more locking brackets;

wherein at least one of the locking brackets of the second locking means is attached to the gas cylinder placement unit and another locking bracket is free, assembling them together between the frame member and/or the rear cross-member with a connection member to lock the gas cylinder placement unit with the vehicle frame and optionally with the rear cross-member;

wherein said connection member includes a nut and a bolt, and wherein said bolt is inserted into the free locking bracket from the outside of the vehicle frame in penetration therethrough, on the right and/or left positions of the frames, and/or on the rear cross-member.

* * * * *